(12) United States Patent
Ramnarain et al.

(10) Patent No.: US 8,757,918 B2
(45) Date of Patent: Jun. 24, 2014

(54) QUICK-CONNECT MOUNTING APPARATUS FOR MODULAR PUMP SYSTEM OR GENERATOR SYSTEM

(76) Inventors: David R. Ramnarain, Shakopee, MN (US); Brian D. Ramnarain, Shakopee, MN (US); Pamela Ramnarain, Shakopee, MN (US); Christopher D. Ramnarain, Shakopee, MN (US)

( * ) Notice: Subject to any disclaimer, the term of this patent is extended or adjusted under 35 U.S.C. 154(b) by 707 days.

(21) Appl. No.: 12/963,850

(22) Filed: Dec. 9, 2010

(65) Prior Publication Data

US 2011/0142536 A1   Jun. 16, 2011

Related U.S. Application Data

(60) Provisional application No. 61/286,641, filed on Dec. 15, 2009.

(51) Int. Cl.
   *F16D 1/00*   (2006.01)

(52) U.S. Cl.
   USPC ...... 403/321; 403/DIG. 4; 248/678; 248/681; 417/360; 464/901

(58) Field of Classification Search
   USPC ........ 403/52, 102–104, 321, 324, 373, 374.1, 403/374.2, 374.5, DIG. 4; 248/560, 562, 248/639, 672, 678, 680, 681; 417/360; 464/901

See application file for complete search history.

(56) References Cited

U.S. PATENT DOCUMENTS

| | | | | |
|---|---|---|---|---|
| 3,257,956 A | * | 6/1966 | Logue et al. | 415/197 |
| 4,588,358 A | * | 5/1986 | Rietschle | 417/247 |
| 4,601,378 A | * | 7/1986 | Pierce et al. | 192/115 |
| 4,877,984 A | * | 10/1989 | Colwell et al. | 310/66 |
| 4,900,224 A | * | 2/1990 | Timperi et al. | 415/213.1 |
| 5,531,573 A | * | 7/1996 | Nokubo | 417/360 |
| 6,135,726 A | * | 10/2000 | Robertson et al. | 417/360 |
| 6,502,809 B1 | * | 1/2003 | Gionta | 269/43 |
| 7,074,017 B2 | * | 7/2006 | Coray et al. | 417/360 |
| 7,125,191 B2 | * | 10/2006 | Murase et al. | 403/1 |
| 7,614,855 B2 | * | 11/2009 | Cook | 417/360 |

* cited by examiner

*Primary Examiner* — Gregory Binda
*Assistant Examiner* — Nahid Amiri
(74) *Attorney, Agent, or Firm* — Thomas J. Nikolai; Nikolai & Mersereau, P.A.

(57) ABSTRACT

A quick-connect mounting apparatus used to join a drive mechanism to a driven mechanism permits rotatable members of the drive mechanism and driven mechanism to be aligned and joined together for proper operation.

19 Claims, 14 Drawing Sheets

QUICK-CONNECT MOUNTING APPARATUS FOR MODULAR PUMP SYSTEM OR GENERATOR SYSTEM

CROSS-REFERENCED TO RELATED APPLICATIONS

This application claims priority under 35 U.S.C. §119(e)(1) to U.S. Provisional Application Ser. No. 61/286,641, filed Dec. 15, 2009, herein incorporated by reference.

STATEMENT REGARDING FEDERALLY SPONSORED RESEARCH OR DEVELOPMENT

Not applicable.

BACKGROUND OF THE INVENTION

I. Field of the Invention

The present invention generally relates to systems for quickly connecting and disconnecting a drive member of a first device and a driven member of a second device. Exemplary embodiments of the present invention relate to quick-connect systems for coupling and decoupling the drive member of a motor and a driven member of a pump or generator.

II. Related Art

A pump is a device used to move fluids, such as liquids, slurries, or gases. A pump displaces a volume by physical or mechanical action. For a pump to displace a volume of fluid, power must be supplied to the pump. While power is supplied to some pumps manually, motors are often used to supply power to a pump. In a similar fashion, motors are often used to supply power to a generator.

Sometimes it is necessary to separate a motor from a pump or generator to facilitate cleaning, repair, maintenance, or replacement of either the pump or generator or the motor. To date this has been a time-consuming task, sometimes requiring the participation of multiple people skilled in varying trades, including plumbing, electrical, and mechanical repair. Thus, there is a real need for a system which allows the motor to be quickly and easily detached from a pump or generator and attached to a different pump or generator (or to the same pump or generator after maintenance, cleaning or repair). This need is particularly acute for companies filling containers with liquids or otherwise dispensing liquid products.

Companies filling containers with liquid products or otherwise dispensing liquid products often need to be able to switch from filling or dispensing one product to another as quickly as possible. Many liquid filling companies have a "servo filler" machine, which has a pumping system consisting of a servomotor and a pump. In a servo filling machine, the pump is powered by, and is mechanically attached to, a servomotor. In a typical filling operation, the input of the pump is connected to a tank containing the product to be filled, and the output goes to a nozzle, which is inside or above a container.

In many industries, the pump needs to be cleaned at regular intervals. This is necessary for both sanitary purposes, and to prevent one product mixing with another, since the same pump is often used for more than one product.

In many servo filling systems, the pump is rigidly attached to the machine. This means that if the machine were to be sanitized, the filling process would have to come to a halt, while employees clean the pump. This is often a time consuming process.

The old methods of cleaning the pumps require the filling machine be stopped until the pump can be thoroughly cleaned or replaced. In the past, these steps have required substantial time, effort and training given the way pumps and motors have been traditionally attached to each other and to the equipment with which they are used. The old methods used by "contract packaging companies" and others decrease their bottle-per-minute output and thus the profitability of such companies.

In view of the foregoing, there exists a substantial need for a quick-connect mounting apparatus for pumps, generator, and other systems that allow a motor to be quickly and easily detached and reattached from a pump or generator.

SUMMARY OF THE INVENTION

The various embodiments of the present invention allow a first mechanism, such as a motor, to be quickly and easily coupled to and decoupled from a second mechanism such as a pump or generator. Further, embodiments of the present invention allow a rotatable member (e.g., a shaft) of a first mechanism to be quickly and easily connected to or disconnected from a rotatable member (e.g., a shaft) of a second mechanism. When the rotatable member of a motor is connected to the rotatable member of a pump or generator, rotation of the motor's rotatable member can impart rotational motion to the rotatable member of the pump or generator. In this fashion the motor powers the pump or generator.

Embodiments of the present invention can be used with a pump/motor system and allow the user to quickly remove an old pump and install a new pump. Such embodiments allow a user to quickly and easily unlock and separate a motor from a pump. Such embodiments also allow a user to replace the pump by placing a new pump onto a loading area and pushing the pump into place along a track or as constrained by a linkage so as to maintain accurate alignment of the respective shafts. As the user does this, the rail or linkage guides the pump accurately into the desired position where it is joined to the motor and can be locked in place.

Embodiments of the present invention allow for a "dirty" set of pumps to be removed, and a "clean" set of pumps replaced relatively quickly. The dirty set of pumps can then be cleaned for later reuse at the company's convenience, at a separate cleaning station without undue interruption in the operation of a production line.

Embodiments of the present invention provide a pump/motor system allowing the pump to be quickly removed from the entire system. Since minimal adjustment is needed for aligning the rotatable members (e.g., the shafts), the pump can be quickly reattached.

Embodiments of the present invention provide a tapered press-fit coupling. The tapered press-fit coupling is split into two pieces, which allows the remaining half of the coupling to be attached to the pump and half and of the coupling to be attached to the motor. When the two pieces are pressed together they provide alignment and frictional connection which allows the motor to drive the pump. Such embodiments provide a simple locking mechanism to ensure the two pieces of the press-fit coupling to stay connected while the pump and motor are being used. More specifically, the various embodiments of the present invention provide, among other things, (a) a base; (b) a bracket secured to the base and coupled to a first mechanism (e.g., a motor) to support the first mechanism in a fixed position relative to the base, the first mechanism having a first rotatable member (e.g., a shaft); (c) a first engagement member (e.g., a track or arm of a linkage) on the base; and (d) an assembly comprising a second engagement member (e.g., a bearing or another arm of a linkage) and a second mechanism (e.g., a pump or generator) having a second rotatable member. The second engagement member is operatively coupled to the first engagement member to guide the assembly as it is moved between a first position in which the second rotatable member is not attached to the first rotatable member and second position in which the second rotatable member and the first rotatable member are joined together. The various embodiments of the present invention also provide a lock having a locked position temporarily securing the assembly in the second position and an unlocked position permitting movement of the assembly between the first position and the second position.

By way of example, the lock may include one or more locking means for locking the second mechanism in the second position. The locking means may, for example, include at least one plate secured to the base. Each plate has an elongate slot surrounded by an engagement surface. Such a locking means may also include at least one locking bolt having a shank which extends through the slot in the plate and a head. The head has an unlocked position which allows the second mechanism to move and a locked position in which the head engages the engagement surface to restrict movement of the second mechanism. When such embodiments of the present invention are employed, the second mechanism (e.g., a pump or generator) can easily be removed by loosening the locking bolt(s), moving the assembly including the second mechanism back toward the first position, and then detaching the assembly from the first engagement member. A pump or generator can be reconnected to the motor by reattaching the assembly including the pump or generator to the first engagement member, moving the assembly into the second position and tightening the locking bolt(s).

When the present invention is employed, less than a minute is required to replace a pump or generator. This is particularly true when the first and second rotatable members are joined together by a press-fit coupling including a first piece having an exterior tapered wall attached to one of the rotatable members and a second piece having an interior tapered wall attached to the other of the rotatable members. When such a press-fit coupling is used, the interior tapered wall and the exterior tapered wall engage each other to transfer rotating movement of one of the rotatable members to the other.

DETAILED DESCRIPTION

Figure 1:
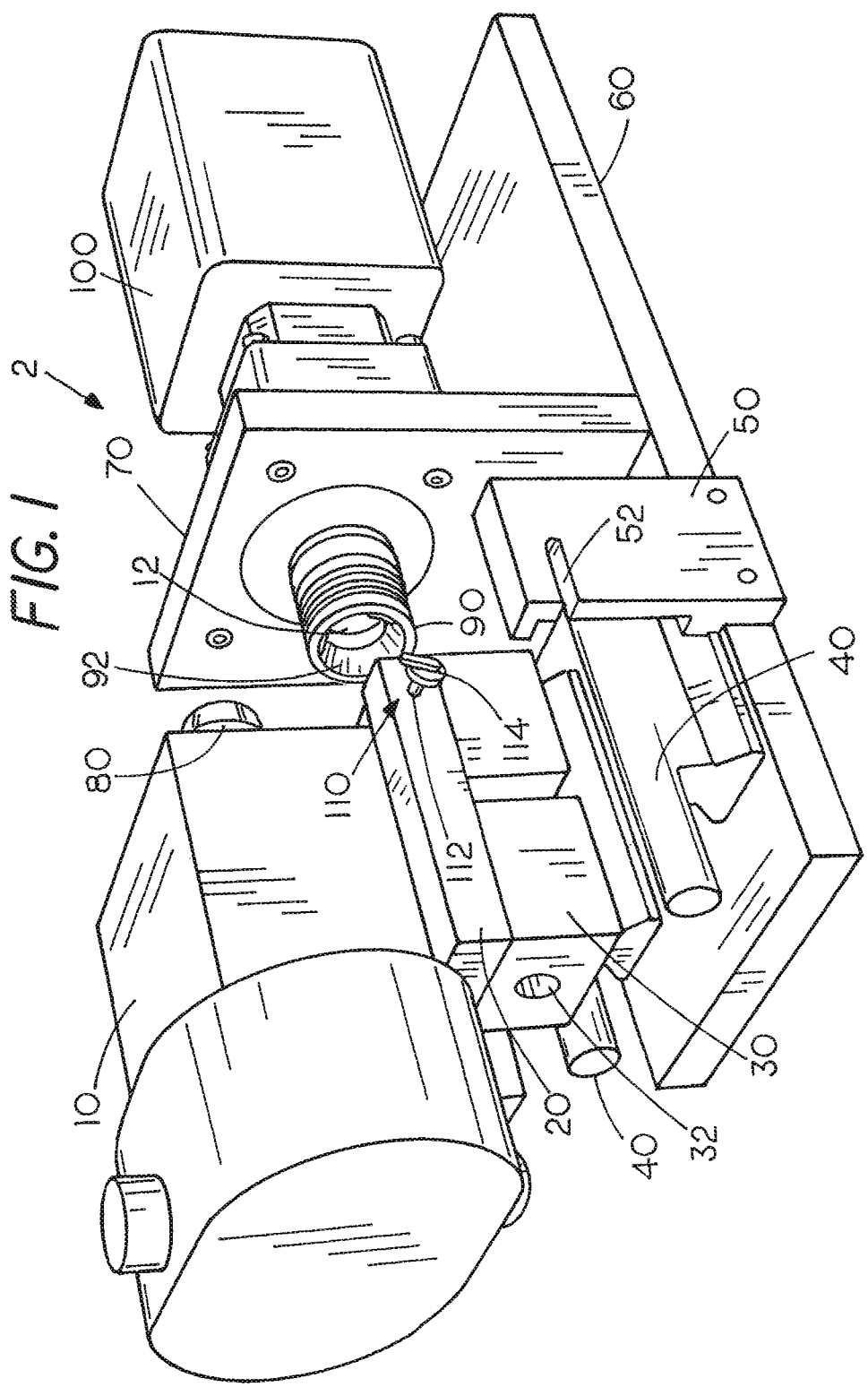
FIG. 1 is a perspective view of a quick-connect mounting apparatus with the driving member uncoupled from the driven member made in accordance with the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention allow the user, for example, to reduce the "down time" they experience when cleaning a pumping system (e.g., in a liquid-packaging company). This is significant for users who have many different products to fill into bottles or other containers. Further, changing the pump is quick and easy. No skilled technicians are needed to perform this simple task.

Alternative embodiments can provide for varying structures to handle varying amounts of torque. It might be possible that the torque created might be too much for the driven system. If this were the case, then a "scaled up" version of the system could be implemented to handle the extra torque.

As shown in the drawings, the quick-connect mounting apparatus 2 can be used to connect a first mechanism e.g., motor 100) to a second mechanism (e.g., pump 10). As shown, pump 10 and motor 100 each have a rotatable member. As shown in the drawings, these are the shaft 11 (FIG. 2) of pump 10 and the shaft 12 of motor 100. The rotatable members of pump 10 and motor 100 are joined together using the quick-connect mounting apparatus 2 so that the rotatable member of the motor 100 drives the rotatable member of the pump 10. The second mechanism need not be a pump. It could also be a generator, compressor, or any other device having a rotary member typically driven by a motor. Also, the location of the first and second mechanism may be reversed. Ideally, the mechanism most likely to require repair, maintenance, or cleaning will occupy the position of pump 10 in the drawings.

Figure 2:
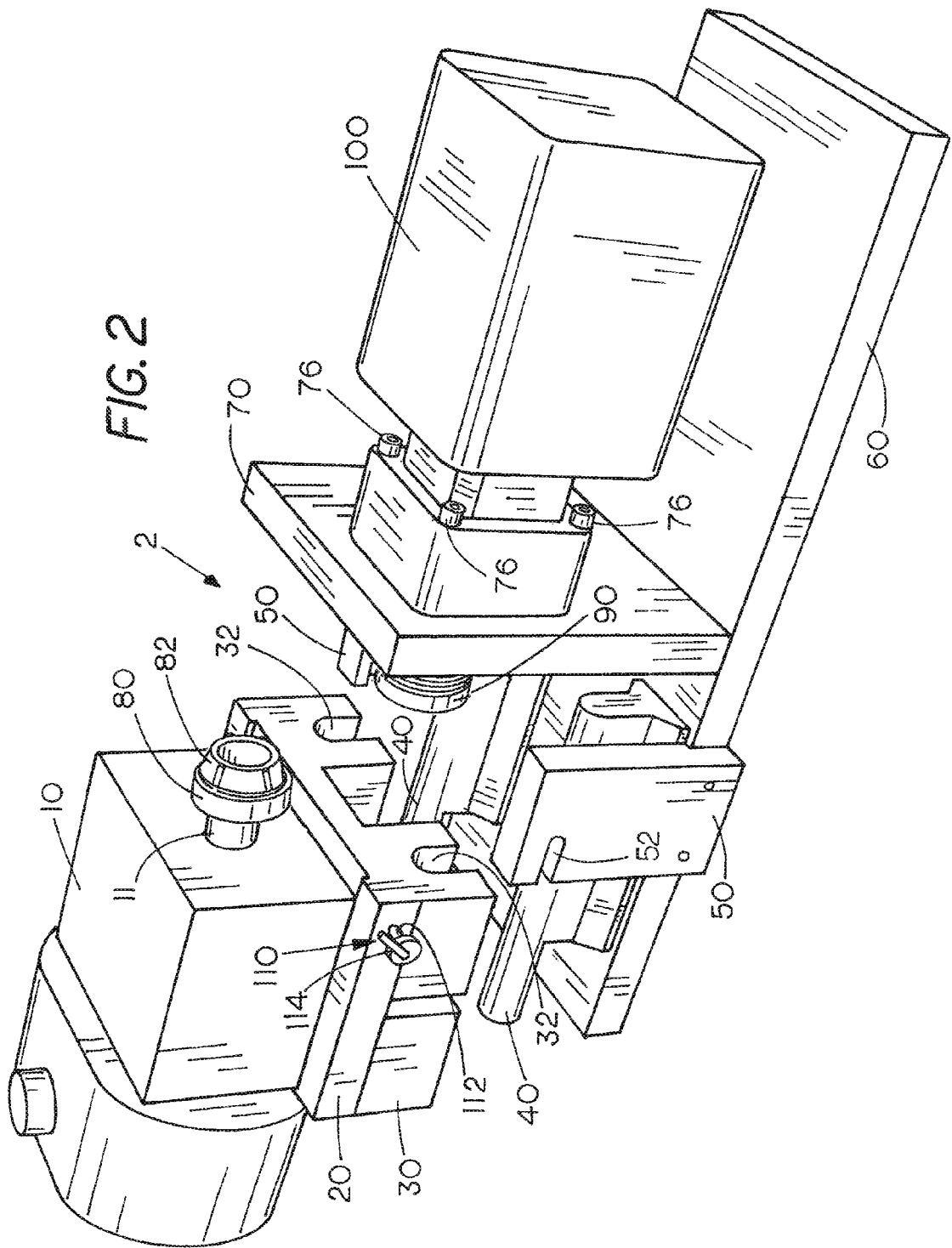
FIG. 2 is a second perspective view of the quick-connect mounting apparatus of FIG. 1 taken from a different angle.
Figure 10:
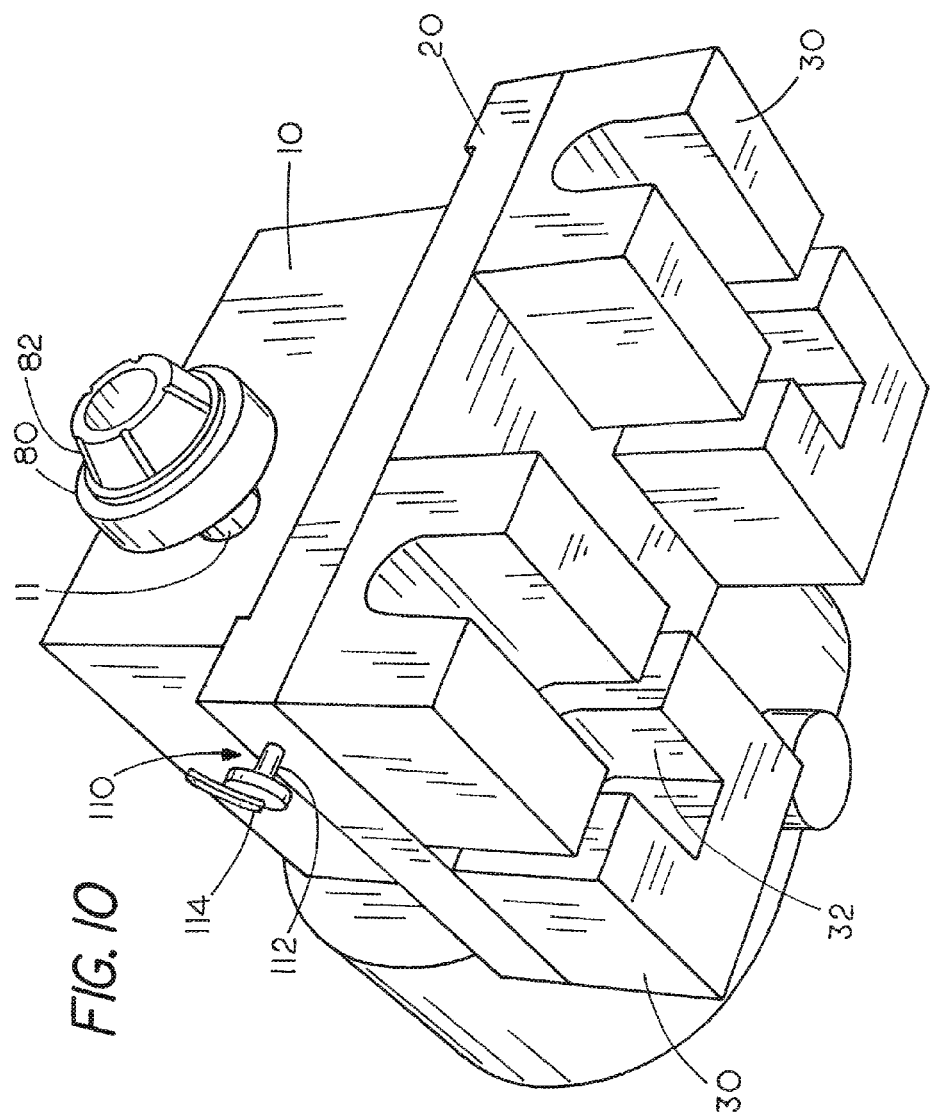
FIG. 10 is a perspective view taken from below showing the mechanism to be driven by the motor connected to a plate.
Figure 11:
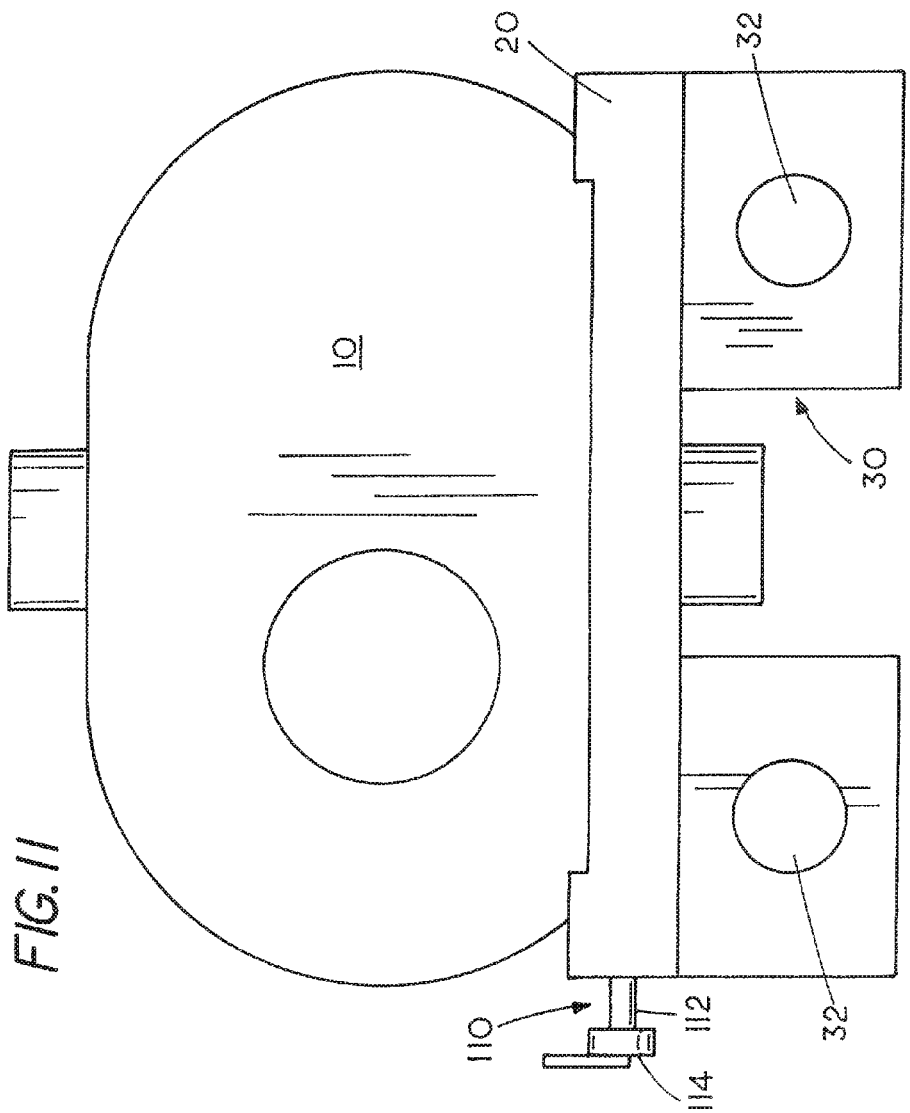
FIG. 11 is an end plan view showing the mechanism to be driven by a motor connected to the plate.

The quick-connect mounting apparatus 2 shown has an assembly comprising a pump 10, a mounting plate 20 and a slide bearing 30. As shown in FIG. 2, the slide bearing 30 has a pair of channels 32. See FIGS. 2, 10 and 11.

Figure 12:
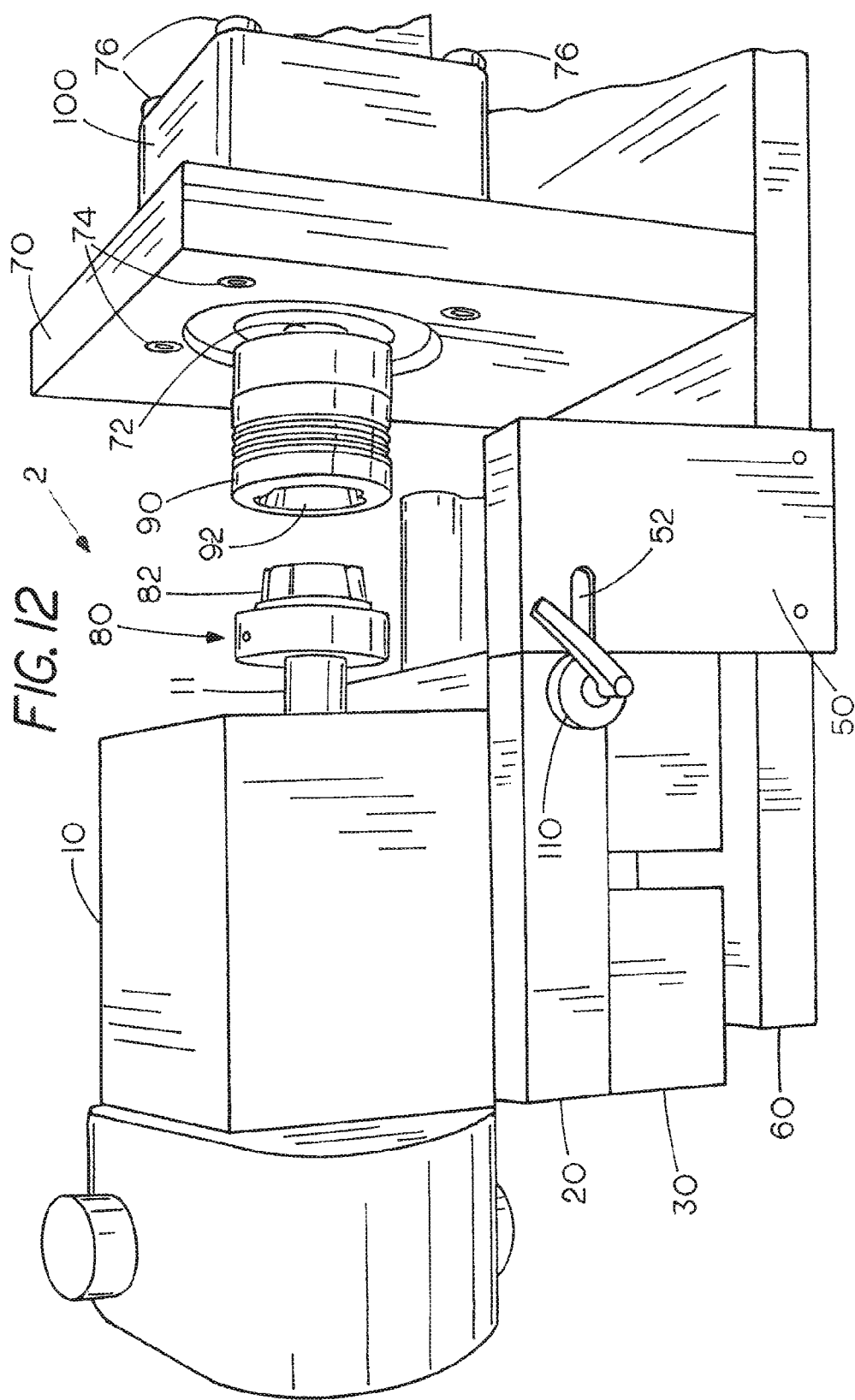
FIG. 12 is a perspective view with the pump in a first position.

The quick-connect mounting apparatus 2 also includes a base 60. Extending upwardly from the base 60 is a bracket 70. Bracket 70 has a bore 72 (FIG. 12) and a plurality of threaded holes 74. The motor 100 is attached to the bracket 70 so that a rotating shaft 12 of the motor 100 extends through the bore 72. Bolts 76 cooperate with the threaded holes 74 to fasten the motor 100 to the bracket 70.

Figure 3:
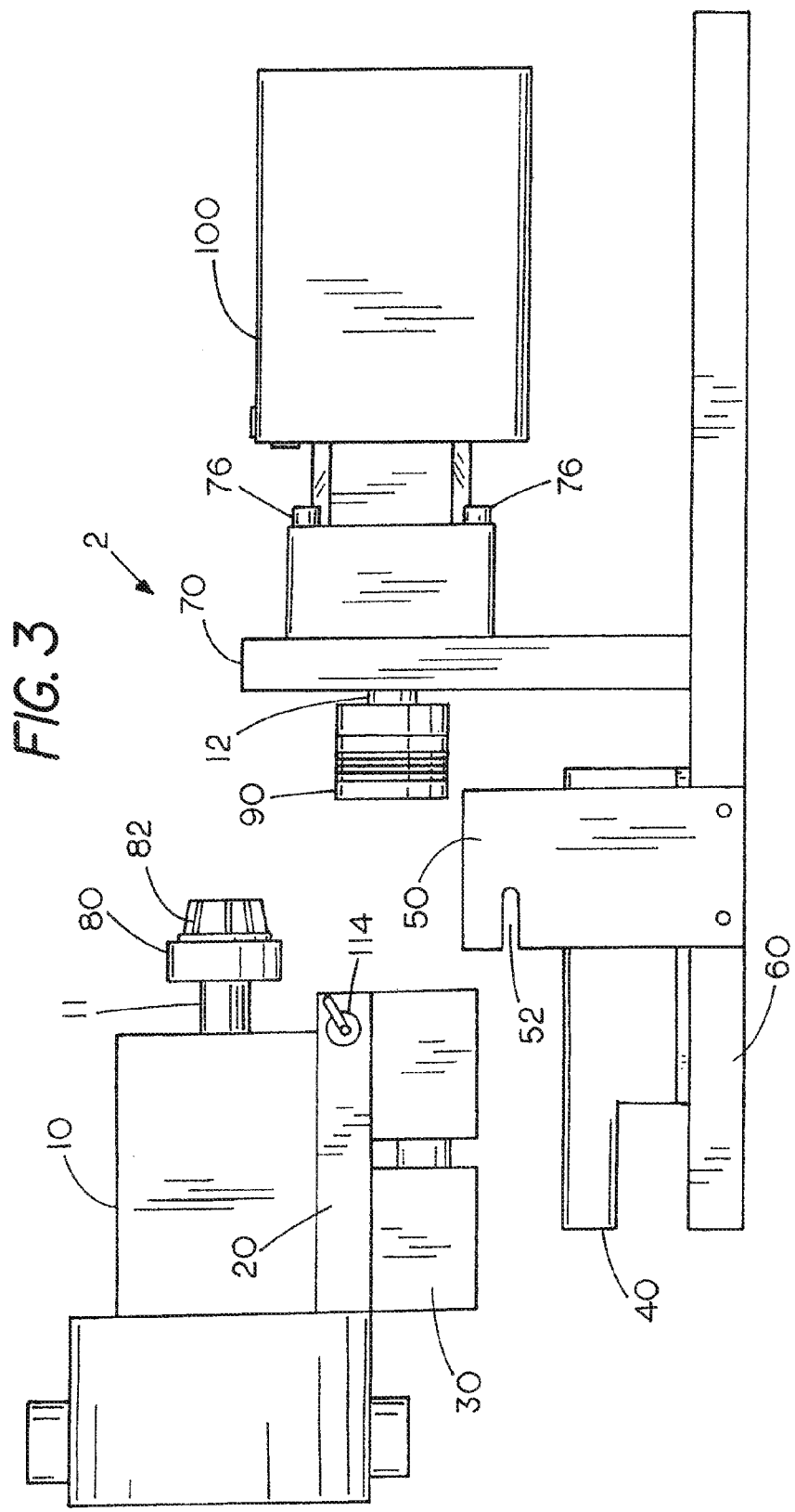
FIG. 3 is a side plan view of the quick-connect mounting apparatus of FIG. 1 with the driving member uncoupled from the driven member.
Figure 4:
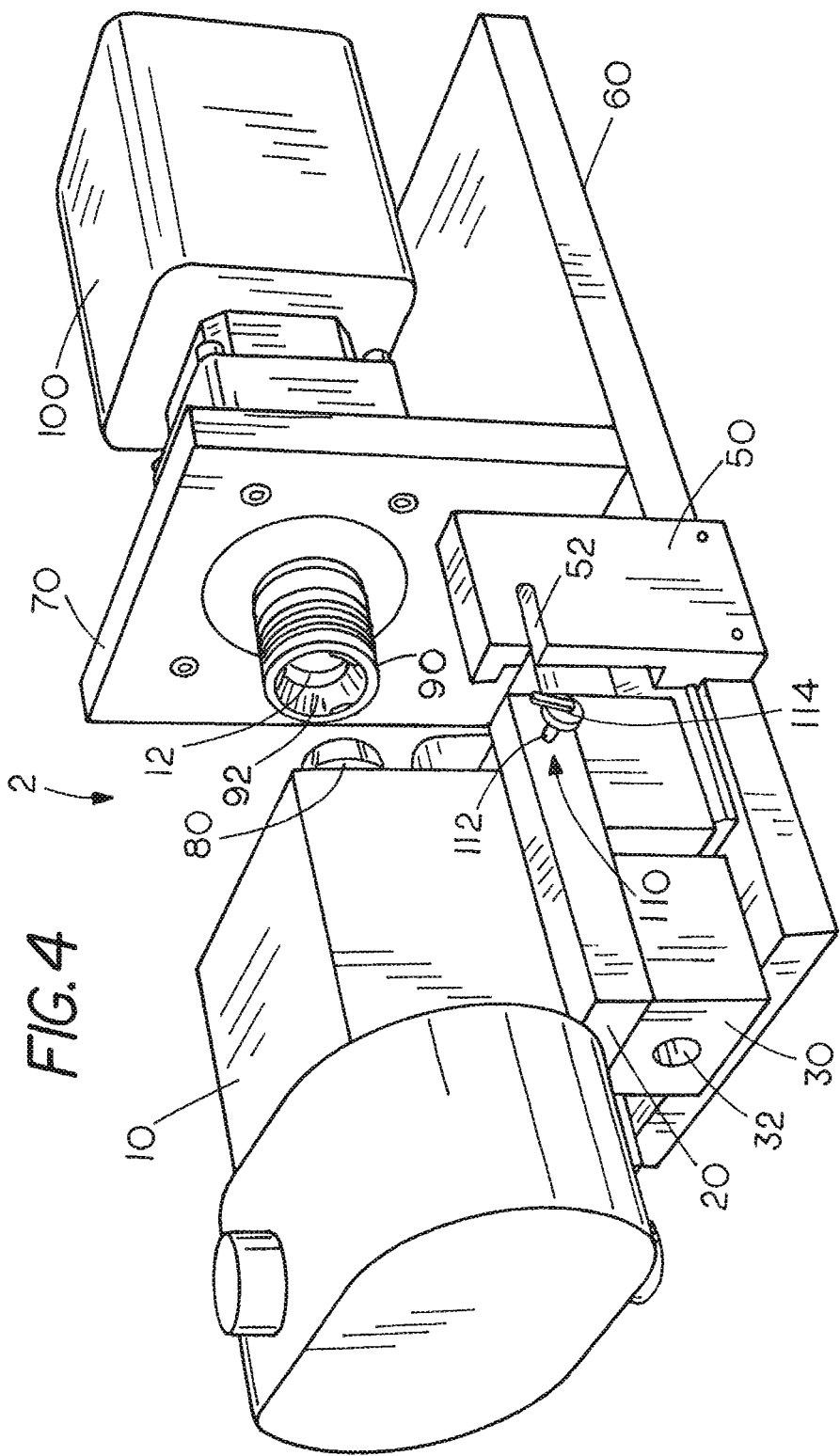
FIG. 4 is another perspective view of the quick-connect mounting apparatus of FIG. 1, this time with a mechanism to be driven by a motor in a first position.
Figure 5:
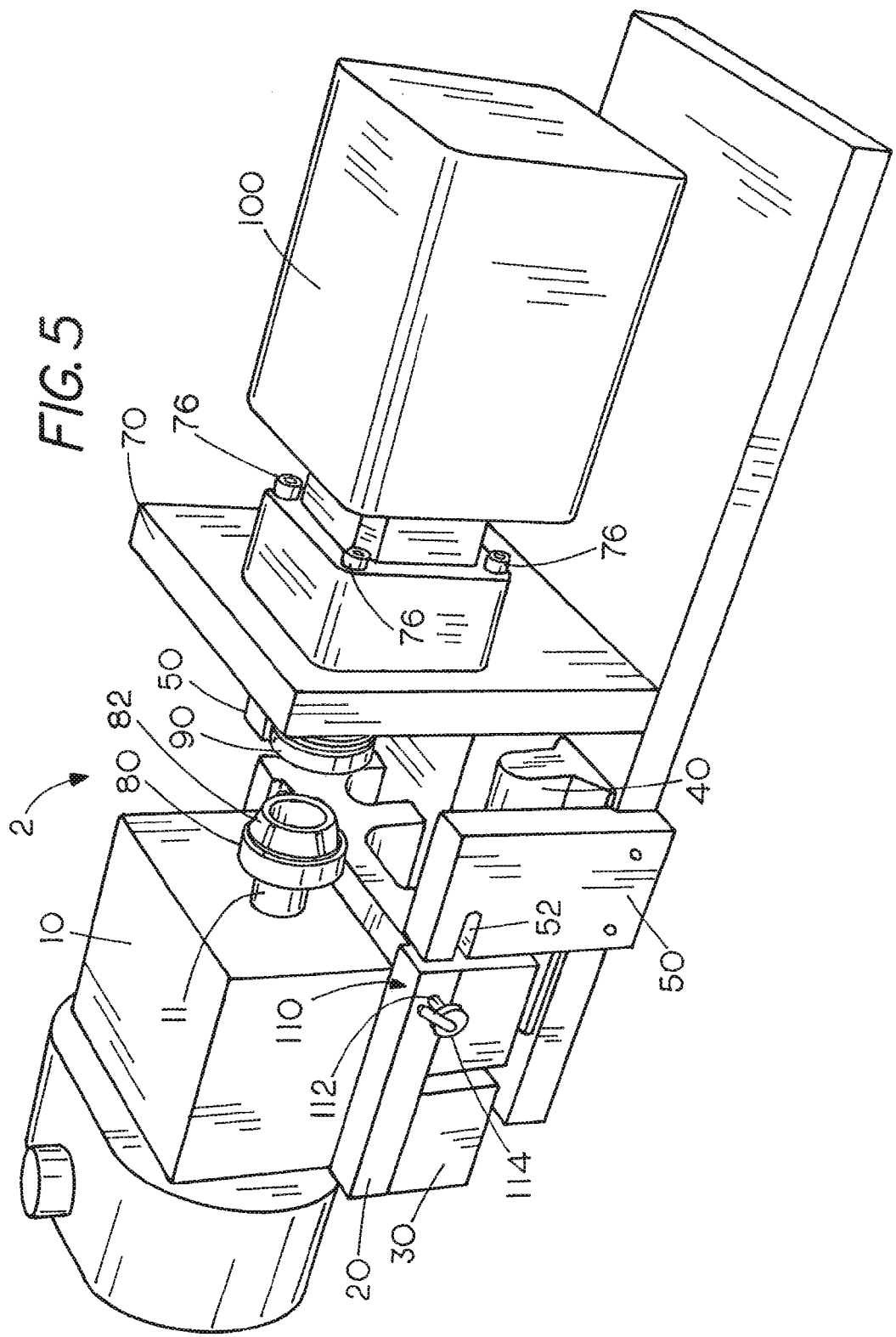
FIG. 5 is still another view of the quick-connect mounting apparatus of FIG. 1 with the mechanism to be driven by the motor mechanism in a first (uncoupled) position.
Figure 6:
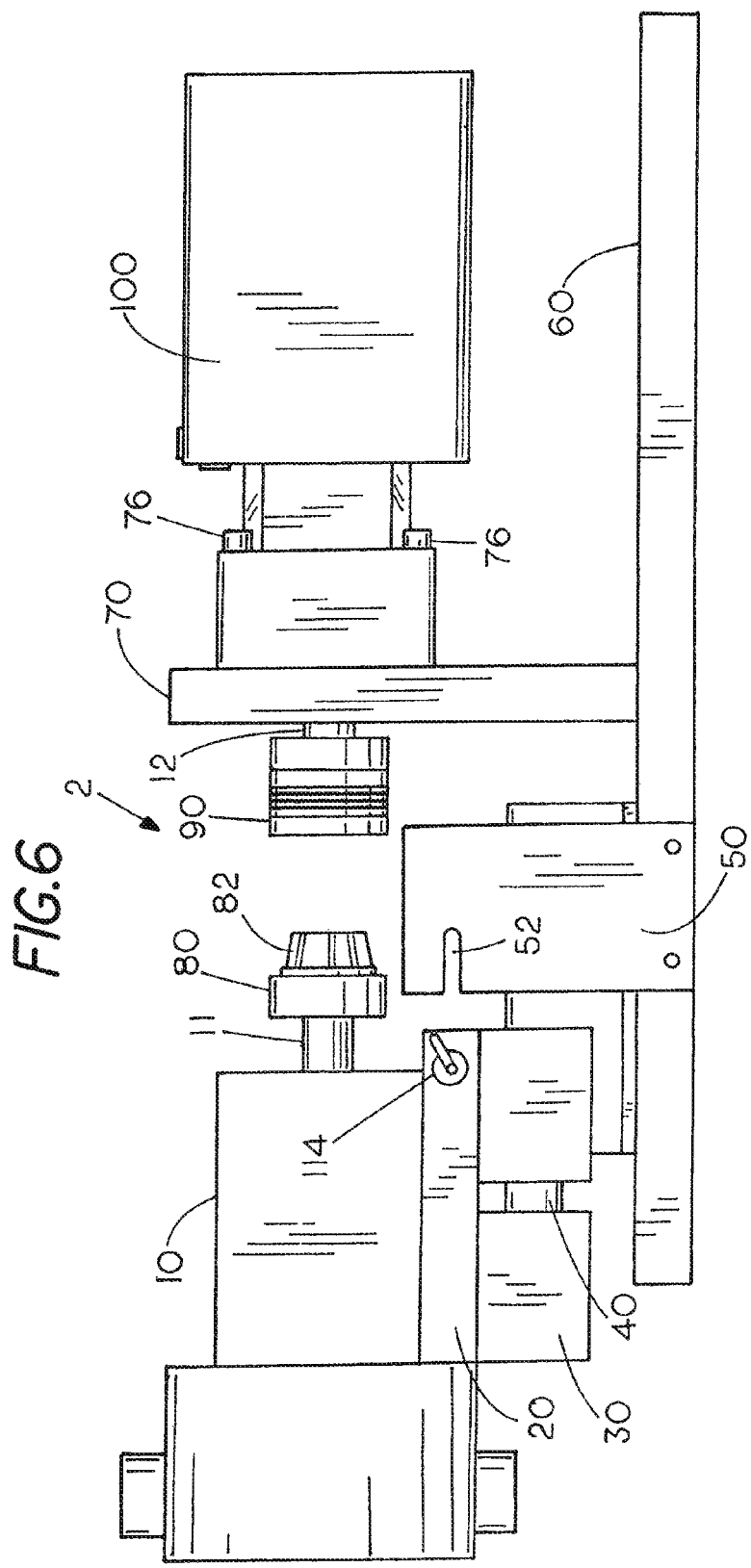
FIG. 6 is a side plan view of the quick-connect mounting apparatus of FIG. 1 with the mechanism to be driven by a motor in its first uncoupled position.

The quick-connect mounting apparatus 2 also includes at least one slide rail 40 attached to the base 60. Two such rails 40 are shown in the drawings. The rails 40 extend in a direction generally perpendicular to the bracket 70 and parallel to the axis of rotation of the shaft of motor 100. When the quick-connect mounting apparatus 2 is used, the pump 10 of the assembly is held over the rails 40 so that the channels 32 of slide bearing 30 are aligned with the rails 40 as shown in FIGS. 1-3. The pump 10 is then lowered so slide rails 40 are fit into the channels 32 and the bearing 30 rests on the slide rails 40 as shown in FIGS. 4-6. Those skilled in the art will recognize that while the drawings show the rails 40 on the base 60 and the channels 32 on the slide bearing 30, the position of the channels 32 and rails 40 may be reversed without deviating from the invention.

Figure 7:
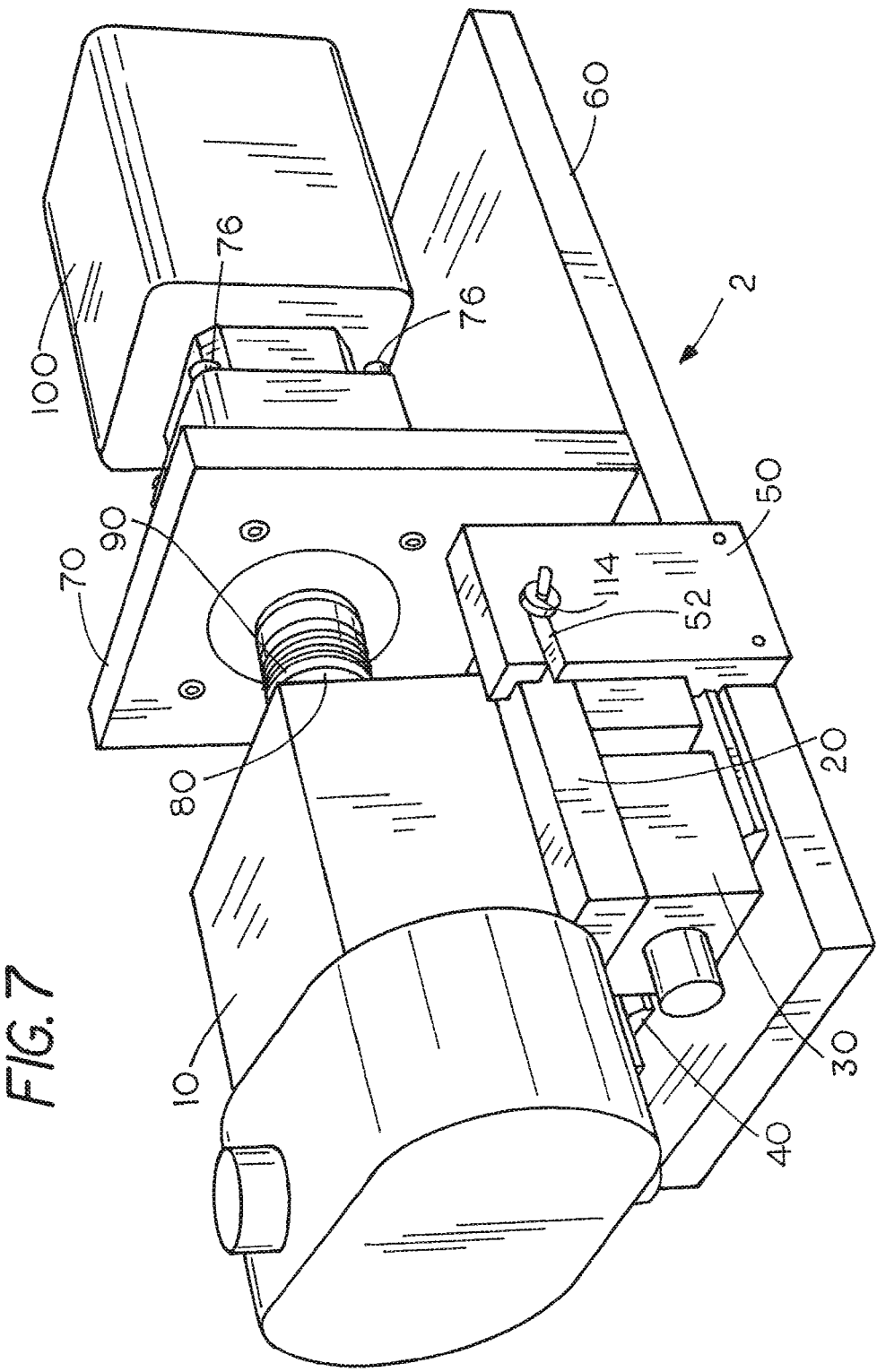
FIG. 7 is a perspective view of the quick-connect mounting apparatus of FIG. 1 with the mechanism to be driven by a motor in a second (coupled) position.
Figure 8:
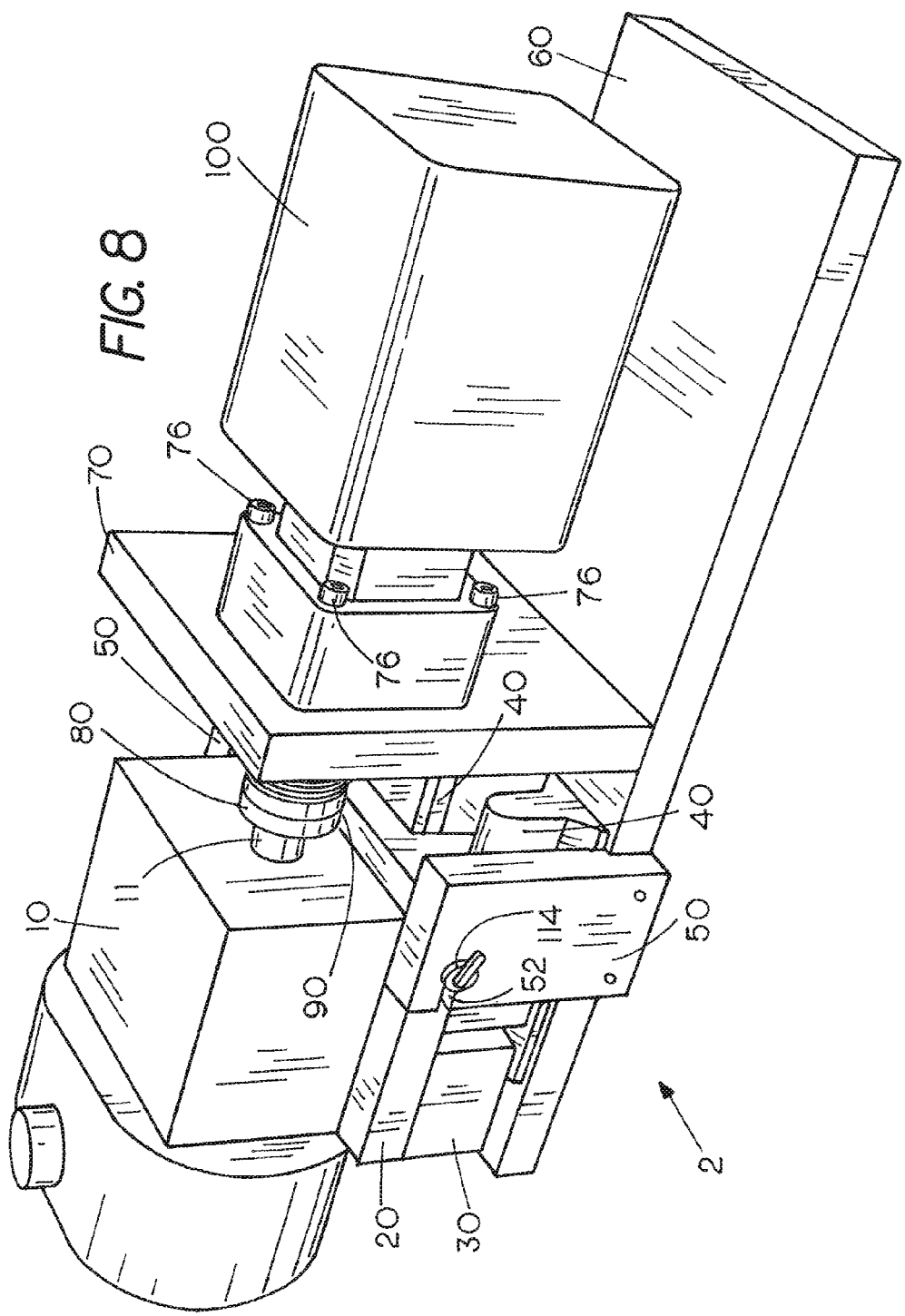
FIG. 8 is another perspective view of the quick-connect mounting apparatus of FIG. 1 with the mechanism to be driven by a motor in the second (coupled) position.
Figure 9:
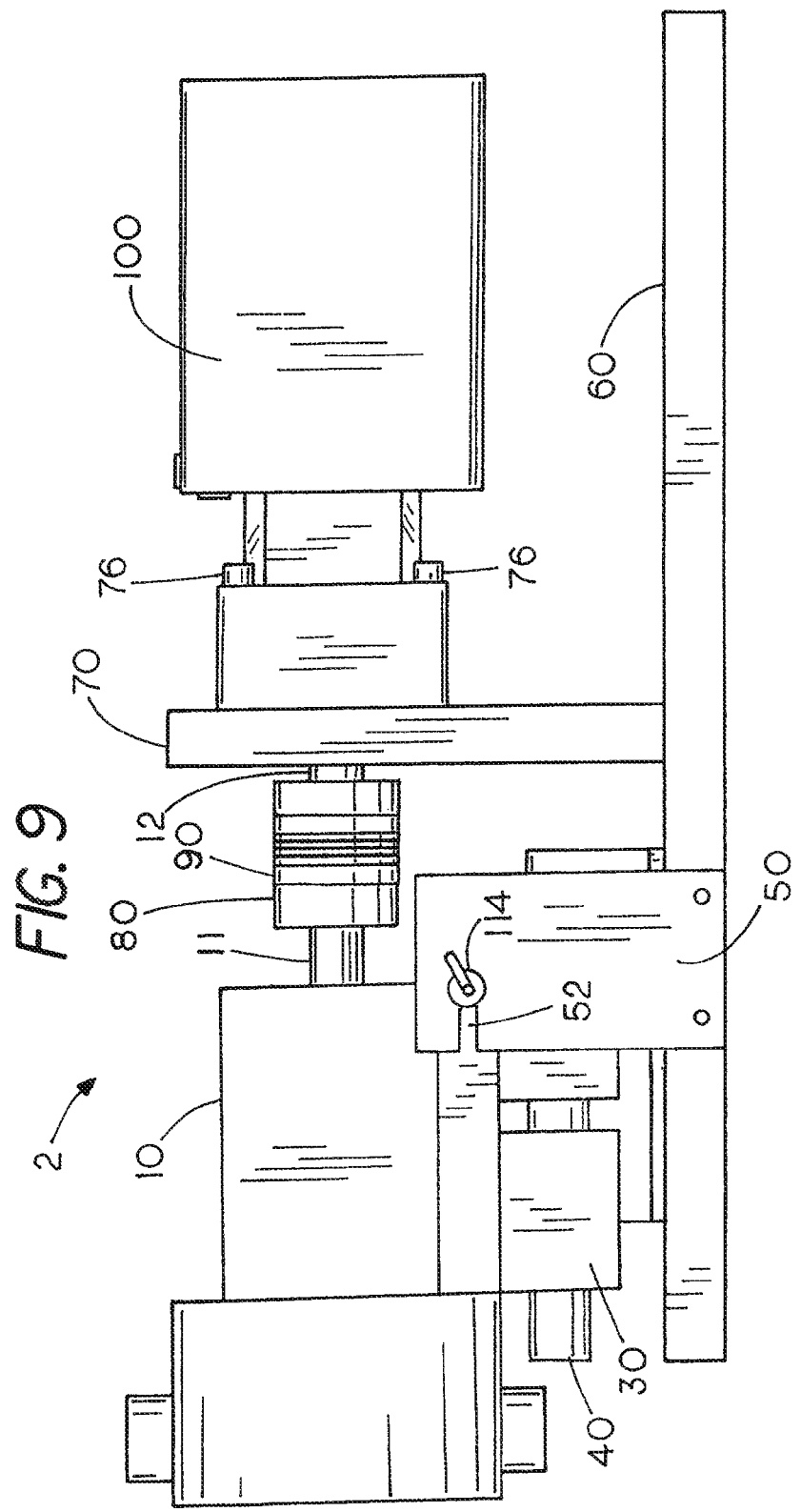
FIG. 9 is a side plan view of the quick-connect mounting apparatus of FIG. 1 with the mechanism to be driven by the motor in its second (coupled) position.

With the slide rails 40 resting in the channels 32, the assembly comprising the pump 10, plate 20 and bearing 30 are then slid forward on slide rails 40 until the rotatable member of the pump 10 is joined to the rotatable member of the motor 100 as shown in FIGS. 7-9. As shown in these drawings, the slide rails 40 provide a track which serves as a first engagement member and the channels 32 engage the track and serve as a second engagement member. When these engagement members are operatively coupled they serve to guide the assembly as it is moved between the first and second position so that shafts 11 and 90 are aligned with one another.

Figure 14:
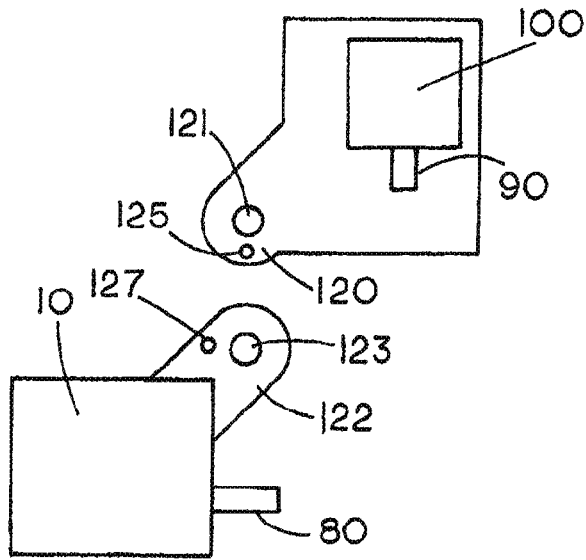
FIG. 14 is a schematic diagram of a second embodiment of the present invention.
Figure 15:
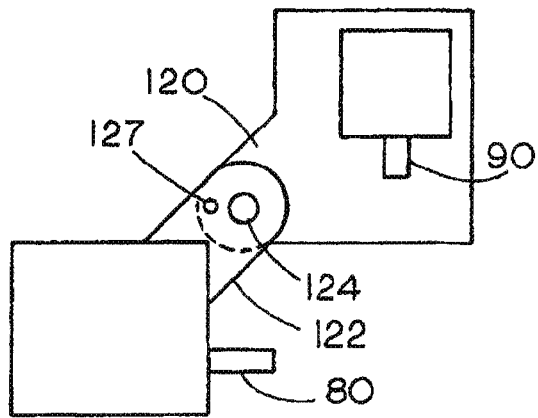
FIG. 15 is a schematic diagram of the embodiment of FIG. 14 with the pump in a first position uncoupled from the motor.
Figure 16:
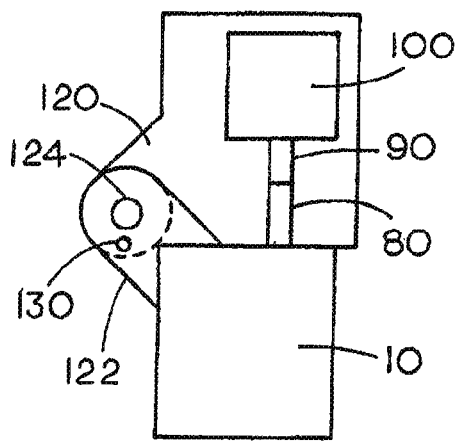
FIG. 16 is a schematic diagram of the embodiment of FIG. 14 with the pump in a second position coupled to the motor.

Other types of cooperating engagement members may be employed. As shown in FIGS. 14-16, the first engagement member is an arm 120 on the base 60 having a pivot pin receiving bore 121 and a lock pin receiving bore 125. The second engagement member is a second arm 122 attached to a pump 10. The second arm has a pivot pin receiving bore 123 and a lock pin receiving bore 127. The arms 120 and 122 are part of a linkage and cooperate with a pivot pin 124 to enable movement of the assembly in a guided fashion between a first position shown in FIG. 15 in which the shaft of the pump 10 is not coupled to the shaft of motor 100 and a second position shown in FIG. 16 in which the shaft of the pump 10 and motor 100 are coupled so rotation of the motor's shaft drives the pump shaft. A locking pin 130 is passed through lock pin receiving bores 125 and 127 to secure the pump in the position shown in FIG. 16. To remove the pump 10, one only has to remove locking pin 130, rotate the pump 10 back to the position shown in FIG. 15, and remove the pivot pin 124.

As best shown in FIGS. 3, 6, 9 and 12, a tapered press-fit coupling may be used to join a rotatable shaft of the motor 100 to a rotatable shaft of the pump 10. The tapered press-fit coupling includes a first piece 80 having a tapered exterior wall 82 attached to the rotatable shaft 11 of the pump 10 and a second piece 90 having a tapered interior wall 92 attached to the rotatable shaft 12 of the motor 100. When the rotatable members of the pump 10 and motor 100 are joined together, the tapered exterior wall 82 of the first piece 80 resides within and in contact with the tapered interior wall 92 of the second piece 90. The tapered interior wall 92 and exterior tapered wall 82 are keyed so that rotation of the shaft of the motor 100 is imparted to the shaft of the pump 10 so the motor 100 can drive the pump 10.

Another feature of the quick-connect mounting apparatus 2 shown in the drawings is the locking mechanism used to secure the pump 10 in the position shown in FIGS. 7-9. The locking mechanism shown includes at least one plate 50 projecting upwardly from the base 60. Two such plates are shown in FIGS. 2 and 5. The plate 50 includes an elongate slot 52 extending inwardly from the side of the plate 50 furthest from the bracket 70. The portion of the locking plate 50 surrounding slot 52 provides an engagement surface.

The locking mechanism shown also includes a locking bolt 110 projecting from each side of the plate 20. Each locking bolt has a shank 112 and a head 114. As the pump 10 is moved from the position shown in FIGS. 4-6 to the position shown in FIGS. 7-9, the shank 112 of each locking bolt 110 enters and moves along the slot 52 in each locking plate 50. When the pump 10 reaches the position shown in FIGS. 7-9, the locking bolts 110 are tightened against the engagement surfaces of locking plates 50 to lock the pump 10 in place. To unlock the quick-connect mounting apparatus so the pump 10 can be removed, all one need do is loosen the locking bolts 110 so that the pump 10 can be slid back away from the motor 100 along the rails 40.

When a linkage, such as that shown in FIG. 14, is employed, the arms of the linkage may have holes 125 and 127 which become aligned when the assembly is in the position shown in FIG. 16 in which the shaft of the motor and the shaft of the pump are coupled. A locking pin 130 can be inserted into the holes 125 and 127 to temporarily lock the assembly in this position.

In the embodiment shown in FIG. 1, the quick-connect mounting apparatus 2 is used with a system incorporating a pump 10 and a motor 100; however, this invention could apply to other systems with different components without departing from the spirit of the present invention. For example, embodiments of the present invention could apply to a gasoline engine connected to a generator.

As is shown in the drawings, pump 10 is designed to move fluid when a shaft 12 is rotated. Plate 20 is secured to the bottom of pump 10 by bolts. However, plate 20 can be fastened to pump 10 by most any method, such as screws, industrial glue, or welding without departing from the spirit of the invention. Plate 20 is also coupled to slide bearing 30 by bolts. However, as stated, pump base plate 20 and slide bearing 30 could be coupled together by most any means. Alternatively, the slide bearing 30 and plate 20 can be integrally formed. In fact, the housing of the pump 10, plate 20, and slide bearing 30 could all be integrally formed without deviating from the invention. Forming them separately, however, provides greater flexibility. Slide bearing 30 is structured to be able to slide on slide rails 40. Slide bearing 30 is shown as being able to be lifted off the slide rails 40 when pump 10 needs to be removed for replacement or cleaning.

The locking mechanism allows pump 10 to be locked into place on slide rails 40 to maintain pump 10 in place during operation. Base 60 acts as a support for both pump 10 and motor 100. Motor bracket 70 acts as a vertical bracket to support motor 100 in position during operation. A tapered press-fit coupling having pieces 80 and 90 provides for the shaft of pump 10 and shaft 12 of motor 100 to be connected and disconnected quickly and without any eccentricity. Other coupling mechanisms can be used, but the inventors have found the tapered press-fit coupling to provide the better connection and quickest release. Motor 100 acts to rotate shaft 12 which in turn rotates the shaft of the pump 10. Rotation of the shaft of pump 10 acts to perform the pumping action of pump 10. Finally, locking bolt 110 acts to clamp pump 10 to base 60 and keeps pump 10 from moving during operation of motor 100 and pump 10. An application of the present invention with reference to a pump and motor will now be described using the steps outlined in FIG. 13.

Figure 13:
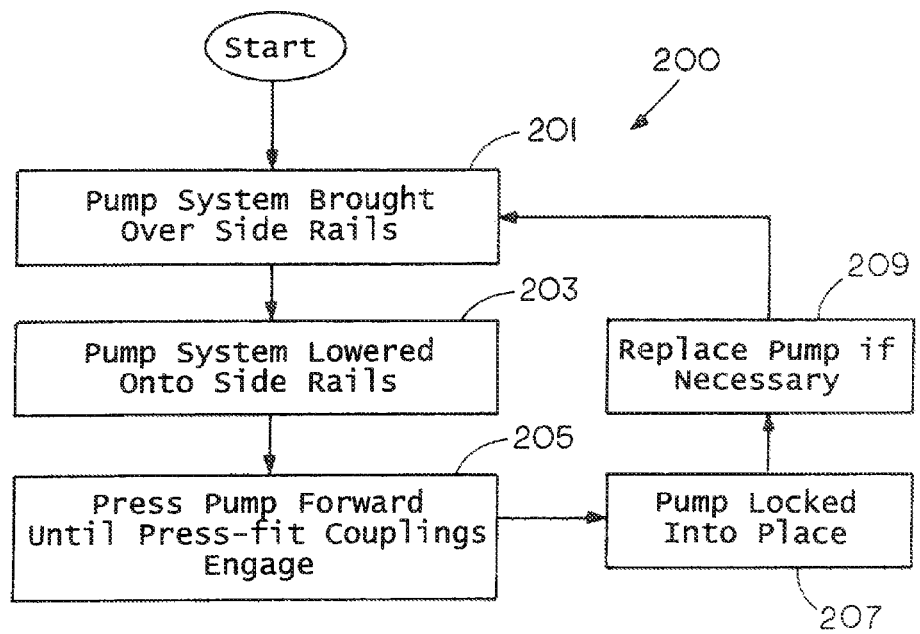
FIG. 13 is a flow diagram describing the installation and removal of a mechanism to be driven by a motor when the present invention is employed.

FIGS. 1-3 show the pump 10 in the initial step of installation corresponding to step 201 in FIG. 13. The operator installing pump 10 first locates pump 10, with pump base plate 20 and slide bearing 30 attached, over slide rails 40.

At step 203 in FIG. 13, the operator places the pump assembly comprising pump 10, pump base plate 20, and slide bearings 30 onto slide rails 40. FIGS. 4-6 show the pump 10 in this lowered position so the slide bearing 30 is upon slide rails.

At step 205 in FIG. 13, the operator pushes pump 10, pump base plate 20, and slide bearings 30 forward until pump tapered press-fit coupling 80 engages motor-tapered press-fit coupling 90 to create a secure shaft coupling. See FIGS. 7-9.

At step 207 in FIG. 13, the operator locks pump 10, pump base plate 20, and slide bearings 30 into place by tightening the locking bolts 110 against the locking plate 50 of the locking mechanism.

Should pump 10 need to be replaced or cleaned, at step 209 of FIG. 13, pump 10 is unlocked by loosening the locking bolts 110, slid back away from the motor 100 and removed from slide rails 40. The process 200 would then begin again at state 201 with a new, repaired, or cleaned pump 10.

In the past, whole systems with the motor and the pump were constructed together in one unit or involved numerous or complicated steps to remove a pump from a motor. When the operator wanted to bring in a new system, the operator would have to bring in a new pump and a new servomotor. This was costly and sometimes required several technicians, electricians, (e.g., a plumber, and repair mechanic) to perform the work. As should be clear from the foregoing, no special skill is required to replace the pump when the present invention is used.

One skilled in the art will appreciate the present teachings can be practiced with embodiments other than those disclosed. The disclosed embodiments are presented for purposes of illustration and not limitation, and the present invention is limited only by the claims which follow.

What is claimed is:

1. A quick-connect mounting apparatus comprising:
   a. a base;
   b. a bracket secured to the base and coupled to a first mechanism to support the first mechanism in a fixed position relative to the base, the first mechanism having a first rotatable member rotatable about a first axis of rotation;
   c. a first engagement member on the base, said first member comprising first and second rails extending in a direction away from the bracket and parallel to the first axis of rotation;
   d. an assembly comprising a second engagement member and a second mechanism, the second mechanism having a second rotatable member, the second engagement member comprising a slide bearing having first and second channels adapted to be positioned over and lowered onto the first and second rails so that the first rail resides within the first channel and the second rail resides within the second channel to operatively couple the second engagement member to the first engagement member with the second rotatable member sharing the first axis of rotation, and wherein the first and second engagement members are adapted to guide the assembly as the assembly is moved along the first and second rails between a first position in which the second rotatable member is not joined with the first rotatable member and a second position in which the second rotatable member and the first rotatable member are joined together; and
   e. a lock having a locked position temporarily securing the assembly in the second position and unlocked position permitting movement of the assembly between the first position and the second position.

2. The mounting apparatus of claim 1 wherein the first mechanism is a motor and the second mechanisms is a pump.

3. The mounting apparatus of claim 1 wherein the first mechanism is an engine and the second mechanism is a generator.

4. The mounting apparatus of claim 1 wherein the first rotatable member drives the second rotatable member when the second rotatable member and the first rotatable member are joined together.

5. The mounting apparatus of claim 1 wherein the first rotatable member and the second rotatable member are joined together by a press-fit coupling when the second mechanism is in the second position.

6. The mounting apparatus of claim 5 wherein the press-fit coupling includes a first piece having an exterior tapered wall attached to one of the rotatable members and a second piece having an interior tapered wall attached to the other of the rotatable members such that the interior tapered wall and the exterior tapered wall engage each other to transfer rotational movement of one of the rotatable members to the other of the rotatable members when the second mechanism is in the second position.

7. The mounting apparatus of claim 1 wherein the bracket comprises a bracket plate having a bore surrounded by a plurality of holes through which mounting bolts can pass to attach the first mechanism to the bracket plate so that the first rotatable member is aligned with the bore.

8. The mounting apparatus of claim 1 wherein the first engagement member comprises a track secured to the base and wherein the second engagement member engages the track so the assembly can slide along the track between the first and second positions.

9. The mounting apparatus of claim 1 wherein the first engagement member and the second engagement member are adapted to engage each other to align the first rotatable member with the second rotatable member.

10. The mounting apparatus of claim 1 wherein the lock comprises:
    a. a locking bolt extending from the assembly and having a shaft and a head, the head having a locked position and an unlocked position,
    b. a locking plate secured to the base and having (i) an elongate slot which receives the shank of the locking bolt such that the locking bolt slides along the slot when the assembly is slid from the assembly's first position to the assembly's second position, and (ii) an engagement surface adjacent the elongate slot which is engaged by the head of the locking bolt when the head is in the head's locked position to restrict movement of the assembly.

11. The mounting apparatus of claim 10 having a second locking bolt extending from the assembly and having a shank and a head, the head having a locked position and an unlocked position, and a second locking plate secured to the base and having (i) an elongate slot which receives the shank of the second locking bolt such that the second locking bolt slides along the slot when the assembly is slid from the assembly's first position to the assembly's second position, and (ii) an engagement surface adjacent the elongate slot which is engaged by the head of the second locking bolt when the head is in the head's locked position to restrict movement of the assembly.

12. A quick-connect mounting apparatus comprising:
   a. a base;
   b. a bracket secured to the base and coupled to a first mechanism to support the first mechanism in a fixed position relative to the base, the first mechanism having a first rotatable member;
   c. a track secured to the base, said track comprising a pair of rails;
   d. an assembly comprising a track engagement member and a second mechanism having a second rotatable member, the track engagement member comprising a pair of channels adapted to be positioned over and lowered onto the pair of rails so that one rail of the pair of rails resides within each channel of the pair of channels to operatively couple the track engagement member to the track and wherein pair of rails and the track engagement member are adapted to guide the assembly as the assembly is moved between a first position in which the second rotatable member is not joined with the first rotatable member and a second position in which the second rotatable member and the first rotatable member are joined together; and
   e. a lock having a locked position temporarily securing the assembly in the second position and an unlocked position permitting movement of the assembly between the first position and the second positions.

13. The quick-connect mounting apparatus of claim 12 comprising:
   a. first and second locking bolts extending from the assembly, each locking bolt having a shaft and a head, the head having a locked position and an unlocked position,
   b. first and second locking plates secured to the base, each of the locking plates having (i) an elongate slot which receives the shank of a locking bolt such that the locking bolt slides along the slot when the second mechanism is moved from the second mechanism's first position to the second mechanism's second position, and (ii) an engagement surface adjacent the elongate slot which is engaged by the head of a locking bolt when the head is in the head's locked position to restrict movement of the second mechanism.

14. The mounting apparatus of claim 12 wherein the first rotatable member drives the second rotatable member when the second rotatable member and the first rotatable member are joined together.

15. The mounting apparatus of claim 12 wherein the first rotatable member and the second rotatable member are joined together by a press-fit coupling when the pump is in the second position.

16. The mounting apparatus of claim 15 wherein the press-fit coupling includes a first piece having an exterior tapered wall attached to one of the rotatable members and a second piece having an interior tapered wall attached to the other of the rotatable members such that the interior tapered wall and the exterior tapered wall engage each other to transfer rotational movement of one of the rotatable members to the other of the rotatable members when the pump is in the second position.

17. The mounting apparatus of claim 12 wherein the bracket comprises a bracket plate having a bore surrounded by a plurality of bolt holes through which mounting bolts can pass to attach the first mechanism to the bracket plate so that the first rotatable member is aligned with the bore.

18. The mounting apparatus of claim 17 wherein the first rotatable member is a shaft which extends through the bore through the bracket plate.

19. The mounting apparatus of claim 12 wherein the first mechanism is a motor and the second mechanism is a pump.

\* \* \* \* \*

UNITED STATES PATENT AND TRADEMARK OFFICE
CERTIFICATE OF CORRECTION

| | | |
|---|---|---|
| PATENT NO. | : 8,757,918 B2 | Page 1 of 1 |
| APPLICATION NO. | : 12/963850 | |
| DATED | : June 24, 2014 | |
| INVENTOR(S) | : David R. Ramnarain et al. | |

It is certified that error appears in the above-identified patent and that said Letters Patent is hereby corrected as shown below:

In the Claims:

In claim 1(c), column 7, line 53, insert --engagement-- after "first". (second occurrence)

Signed and Sealed this
Second Day of September, 2014

Michelle K. Lee
*Deputy Director of the United States Patent and Trademark Office*